United States Patent [19]

Maisonneuve et al.

[11] Patent Number: 5,024,502

[45] Date of Patent: Jun. 18, 1991

[54] SYSTEM TO TRANSMIT OPTICAL INFORMATION AND COMPRISING A PLURALITY OF TRANSMITTERS AND RECEIVERS CONNECTED BY OPTICAL FIBERS

[75] Inventors: Jean-Michel Maisonneuve; Jean-Paul Domergue, both of Toulouse; Gabrielle Parize, Paris; Philippe Palandjian, Blagnac; Jacques Isbert, Toulouse, all of France

[73] Assignees: Office National d'Etudes et de Recherches Aerospatiales (ONERA), Chatillon; Societe Nationale Industrielle et Aerospatiale, Paris, both of France

[21] Appl. No.: 538,152

[22] Filed: Jun. 14, 1990

[30] Foreign Application Priority Data

Jul. 10, 1989 [FR] France ................. 89 09242

[51] Int. Cl.⁵ ............... G02B 6/28; G02F 1/00; G02F 2/00; G02F 3/00
[52] U.S. Cl. ..................... 350/96.16; 455/612
[58] Field of Search ........... 350/96.16; 455/610, 455/611, 612

[56] References Cited

U.S. PATENT DOCUMENTS

| | | | |
|---|---|---|---|
| 4,705,350 | 11/1987 | Cheng | 350/96.16 |
| 4,730,888 | 3/1988 | Darcie et al. | 350/96.16 |
| 4,781,427 | 11/1988 | Husbands et al. | 350/96.16 |
| 4,784,453 | 11/1988 | Shaw et al. | 350/96.16 |
| 4,787,692 | 11/1988 | Spanke | 350/96.16 |
| 4,787,693 | 11/1988 | Kogelnik et al. | 350/96.16 |

FOREIGN PATENT DOCUMENTS

| | | |
|---|---|---|
| 2721728 | 11/1978 | Fed. Rep. of Germany . |
| 2580881 | 10/1986 | France . |
| 8605649 | 9/1986 | PCT Int'l Appl. . |

OTHER PUBLICATIONS

Laser Focus, vol. 15, No. 10, Oct. 1979, pp. 60, 62, 64, 66.
National Aerospace and Electronics Conference NAECON, 1987, May 18–22, 1987, IEEE, New York, U.S., vol. 1, pp. 158–164.

*Primary Examiner*—Akm Ullah
*Attorney, Agent, or Firm*—Marshall, O'Toole, Gerstein, Murray & Bicknell

[57] ABSTRACT

A system for transmitting optical information uses several transmitters and receivers connected by optical fibers. The transmitters and receivers are arranged in individual networks in each of which all the optical fibers leaving the transmitters are coupled to one another and all the optical fibers arriving at the receivers are coupled to one another. In addition, all the optical fibers leaving the transmitters in each individual network are interconnected to the corresponding optical fibers, i.e., those leaving the transmitters, in all the other networks.

9 Claims, 1 Drawing Sheet

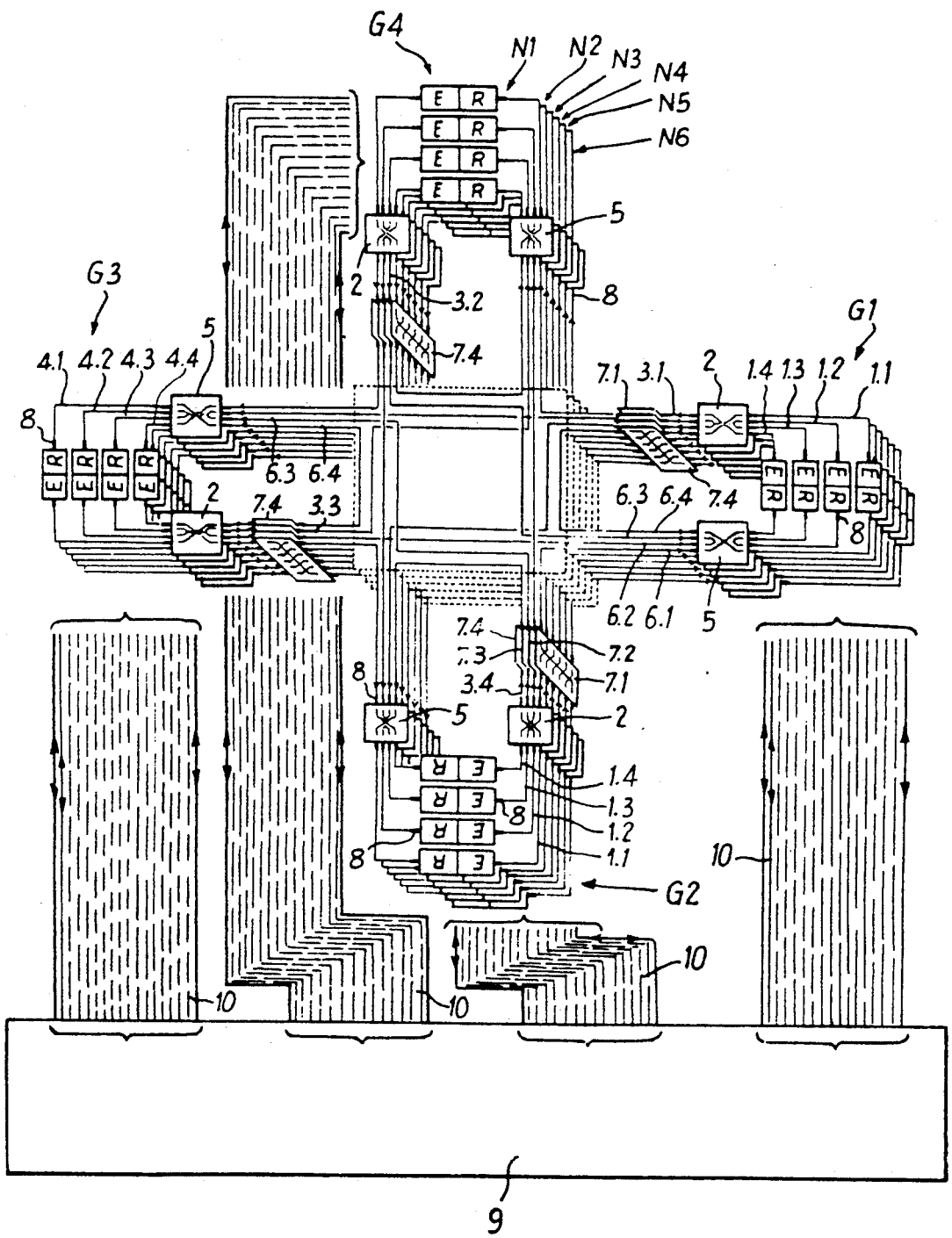

SYSTEM TO TRANSMIT OPTICAL INFORMATION AND COMPRISING A PLURALITY OF TRANSMITTERS AND RECEIVERS CONNECTED BY OPTICAL FIBERS

FIELD OF THE INVENTION

The present invention concerns a system to transmit optical information and in particular for an aircraft.

BACKGROUND OF THE INVENTION

More and more frequently, the transmission of information is effected in an optical form by means of networks of optical fibers interconnected by couplers and/or connectors. Despited their inherent advantages as regards the width of the passband, the slight attenuation of optical fibers ($\simeq 1$ dB per km), the small spatial requirement and light weight, excellent electrical insulation, sound chemical resistance, immunity to electromagnetic interference, as well as the absence of radiations, the known systems for transmitting optical information nevertheless have a certain number of drawbacks.

In actual fact, the power emitted by the transmitters of these systems (for example, electroluminescent diodes) is generally limited with the result that it is necessary to provide high-performing amplifiers at the receivers (for example, PIN diodes), so that the power recived after attenuation of the couplers and connectors is sufficient in order to avoid any excessively high bit error rate. In addition, in particular when such a system comprises a large number of "subscriber" (that is a large number of transmitters and/or receivers), this being the case on board an aircraft, the optical path between an transmitter and a receiver is variable depending on the respective positions of said transmitter and said receiver in said system. Thus, it is necessary to provide gain adjustment means at the receivers so as to adjust the amplitude of the input signal of a receiver in order to correct the influence of the path followed by the information through the system.

These gain adjustment means thus render the receivers complex and greatly complicate implementing components and installing the system. In addition, these means significantly increase costs and reduce reliability.

Thus, it can be seen that in known systems, a high number of subscribers is antinomic of the notion of receivers without any gain control.

SUMMARY OF THE INVENTION

One object of the present invention is to overcome these drawbacks. It concerns a system to transmit optical information which, although having a high number of subscribers, does not require any gain adjustment at the receivers. In addition, the system of the invention may be embodied using simple known elements.

To this end, the system of the invention to transmit optical information comprising a plurality of transmitters and receivers connected by optical fibers is notable in that:

said transmitters and said receivers are divided into a plurality of individual networks;

inside an individual network, all the optical fibers leaving the transmitters are coupled to one another;

inside an individual network, all the optical fibers arriving at the receivers are coupled to one another; and all the optical fibers of an indiviual network leaving the transmitters of the latter are coupled to all the corresponding optical fibers of the other networks.

Thus, in such a system, as shall be seen more clearly from reading the rest of this description, the number of subscribers may be high, although the couplings between the individual networks are obtained with the aid of simple known couplers able to interconnect any optical fibers. In addition, this can be effected in such a way that between any transmitter and receiver of the system, there is the same number of couplers, even if the length of the linking fibers may vary according to the transmitter/receiver paths. Since the attenuation afforded by the optical fibers is negligible compared with the one imposed by the couplers, it can be seen that the attenuation of the transmitter/receiver paths in virtually the same, irrespective of the length of said paths. As a result, the gain adjustment means may be suppressed from the system of the present invention. Furthermore, the use of couplers with a small number of output/input lines increases the reliability of the system.

The transmission system of the invention is preferably provided so that:

inside an individual network, the transmitters and receivers are divided into a plurality of groups of transmitters/receiver pairs;

the individual networks are identical to each other;

couplers between the receivers of a network are disposed upstream of the receivers of each group;

couplers between the transmitters of a network are disposed downstream of the transmitters of each group; and couplers between the transmitters of the various individual networks are disposed downstream of the transmitters of the transmitter/receiver groups which correspond from one individual network to another.

In the present description, the positions "upstream" and "downstream" are regarded according to the direction of travel of the optical information leaving the transmitters and arriving at the receivers. Thus, "downstream" means in the same direction traveled by information in going from a transmitter to a receiver, and upstream means in the opposite direction.

Advantageously, said numbers of transmitter/receiver groups are identical from one individual network to another and all comprise the same number of such pairs. Moreover, within said individual networks, it is preferable that said groups of transmitter/receiver pairs are mounted in star-shaped fashion. It is to be noted that the absence or malfunctioning of one or more subscribers does not adversely affect the functioning of the system.

In one preferred embodiment of the invention:

said transmitters and said receivers are divided into a plurality of identical individual networks having a star-shaped structure;

all the branches of all the individual network are identical and comprises groups of transmitter/receiver pairs;

in each individual network, first couplers between the receivers of each branch are disposed upstream of said groups;

in each individual network, second couplers between the transmitters of each branch are disposed downstream of said groups;

the branches of the individual networks are associated with as many assemblies as there are branches within an individual network;

between the branches of the individual networks of such an assembly, third couplers are disposed downstream of the transmitters of said groups of transmitter/receiver pairs; and the second and third couplers of an assembly of branches are connected to the first couplers of the same assembly and the other assemblies of branches.

By means of such a structure, it is possible to obtain a large number of subscribers with simple couplers. If, for example, each individual network has the shape of a star with four branches and if the number of individual networks is equal to six, a number of subscriber equal to 96 is obtain with the use of simple couplers with four and six input/output lines.

In the transmission system of the invention optical information circulating in the system is received by all the receivers of said system. It is thus essential to provide control means, such as calculation means, making it possible to only sensitize or validate the receiver(s) concerned by this information. Such a sensitization or validation may be obtained in a known way by codes allocated to each receiver, by receiving windows successively allocated to said receivers, or by other known data processing means. It goes without saying that it is also advantages that said calculation means selectively control said transmitters.

Thus, an optical transmission system is obtained in which a particular transmitter is able to send a control order to a particular receiver. This system may therefore be used for the flight control of an aircraft, said calculation means being constituted, for example, by one or several flight control calculators and said receivers delivering information originating from the various devices of the aircraft (sensors, actuators, calculators...).

BRIEF DESCRIPTION OF THE DRAWINGS

The sole FIG. of the accompanying drawing shall reveal how the invention may be embodied.

The particular mode for embodying the invention, diagrammatically illustrated on this sole FIG. concerns a system to transmit optical information and comprises 96 subscribers, each subscriber being represented in the form of a pair comprising a transmitter E and a receiver R.

This system is made up of six identical individual networks N1 to N6 (represented superimposed) each comprising sixteen subscribers.

Each individual network Ni (with i=1,2,3,4,5 or 6) has a four branch star-shaped structure, each branch comprising a group G1 to G4 of four subcriber E, R. In each branch, all the optical fibers 1.1, 1.2, 1.3 and 1.4 originating from a transmitter E are connected to an optical coupler 2 comprising as many outputs as inputs, in other words in the example shown each optical coupler 2 has four inputs constituted by the fibers 1.1 to 1.4 and four outputs connected to optical fibers respectively bearing the references 3.1 to 3.4. Moreover and also in each branch of an individual network Ni, all the optical fibers 4.1, 4.2, 4.3 and 4.4 arriving at a receiver R originate from an optical coupler 5 comprising as many inputs as outputs, in other words in the example represented, each optical coupler 5 has four outputs constituted by the fibers 4.1 to 4.4 and four inputs respectively connected to optical fibers 6.1, 6.2, 6.3 and 6.4. As can be seen on the figure, said optical fibers 6.1 to 6.4 respectively connect the coupler 5 of one branch to the coupler 2 of the same branch and to each of the couplers 2 of the other three branches. Thus in an individual network Ni, any particular transmitter E is connnected to any particular receiver R by means of a coupler 2 and a coupler 5.

In addition, the outputs 3.1 of the couplers 2 and the optical fibers 6.1 of all the individual networks Ni are coupled to each other by couplers 7.1 which, in the example represented, each comprise six inputs and six outputs. The same applies respectively for the outputs 3.2, 3.3 and 3.4 and the optical fibers 6.2, 6.3 and 6.4 by means of the respective couplers 7.2, 7.3 or 7.4 identical to the couplers 7.1.

Thus, it can be seen in the system of the present invention that:

any transmitter E of any group of any individual network Ni is coupled to any receiver R of any group of any individual network; and the optical linking between one transmitter E and one receiver R is always effected through a coupler 2, a coupler 7.j (with j=1, 2, 3 or 4) and a coupler 5, irrespective of the geographical positions of said transmitter and of said receiver and irrespective of the networks Ni to whch they belong.

This latter particular feature is extremely important as, in an optical transmission system, the power transmission attenuation between a transmitter E and a receiver R is mainly due to the optical couplers; in fact, the attenuation due to the optical fibers is much less. Thus, in the system of the invention, in the symmetrical network version with the number of couplers inserted between a transmitter and a receiver (namely three) being the same, irrespective of the positions of these in the system, the power attenuation is identical as regard all the transmitter/receiver paths, the differences of attenuation due to the length differences of the optical fibers from one path to another being negligible.

Thus, in the system of the invention, there is not need to provide gain adjustment means to compensate for any attenuation variations due to the differences of the paths followed by the optical information.

Moreover, it shall be observed that, although in the example described above the couplers 7.j were disposed between the outputs 3.1 to 3.4 of the couplers 2 and the lines 6.1 to 6.4 (that is, downstream of the couplers 2), it goes without saying that said couplers 7.j could be inserted in the lines 1.1, 1.2, 1.3 and 1.4, that is upstream of the couplers 2.

The various connections between the optical fibers, the couplers and the subscribers are embodied by connectors 8.

It shall further be observed that the transmission system if the invention, although including a large number of subscribers (96 in the example described), may be embodied with the aid of simple known elements, namely the couplers 2 and 5 with four outputs and four inputs, the couplers 7.1 to 7.4 with six inputs and six outputs, and the connectors 8.

The system of the invention further comprises calculation means 9 able to monitor the various subscriber E, R by means of control links 10 so as to firstly selectively control the transmitter E, and secondly to ensure that only the receiver or the receivers R, for which this transmitted information is intended, is/are activated.

By virtue of its structure, the transmission system of the invention may easily be tested by the calculation means 9 so as to verify its good functioning.

It can easily be envisaged that the calculation means 9 may, for example, be a calculator for controlling the flight of an aircraft and that the various receivers R may belong to the system for controlling devices (not shown) of said aircraft, said devices being, for example, flap shutters, rudder units, etc.

What is claimed is:

1. A transmission system for transmitting optical information, said system comprising a plurality of networks, each network comprising
   a plurality of transmitters and receivers connected by optical fibers,
   a first coupler interconnecting all of the optical fibers arriving at said receivers, and
   a second coupler interconnecting all of the optical fibers leaving said transmitters,
   said system also comprising a third coupler interconnecting all of the fibers leaving the transmitters in all of the networks.

2. A transmission system according to claim 1, wherein:
   within an individual network, the transmitters and receivers are divided into a plurality of groups of transmitter/receiver pairs;
   the individual networks are identical to each other;
   couplers between the receivers of a network are disposed upstream of the receivers of each group;
   couplers between the transmitters of a network are disposed downstream of the transmitters of each group; and
   couplers between the transmitters of the various individual networks are disposed downstream of the transmitters of the transmitter/receiver groups which correspond from one individual network to another.

3. A transmission system according to claim 2, wherein said groups of the transmitter/receiver pairs are identical from one individual network to another and all comprise the same number of pairs.

4. A transmission system according to claim 2, wherein within said individual networks, said groups of transmitter/receiver pairs are star-shape mounted.

5. A transmission system according to claim 1, wherein:
   said transmitters and said receivers are divided into a plurality of identical individual networks having a star-shaped structure;
   all the branches of all the individual networks are identical and comprise groups of transmitter/receiver pairs;
   in each individual network, first couplers between the receivers of each branch are disposed upstream of said groups;
   in each individual network, second couplers between the transmitters of each branch are disposed downstream of said groups;
   the branches of the individual networks are associated into as many assemblies as there are branches within an individual nertwork;
   between the branches of the individual networks of such as assembly, third couplers are disposed downstream of the transmitters of said groups of transmitter/receiver pairs; and
   the second and third couplers of an assembly of branches are connected to the first couplers of the same assembly and the other assemblies of branches.

6. A transmission system according to claim 4, wherein each individual network has the shape of a star with four branches.

7. A transmission system according to claim 6, wherein the number of individual networks is equal to six.

8. A transmission system according to claim 1, wherein it comprises calculation means to selectively control said transmitters and enable the optical information transmitter by the latter to selectively sensitize the receiver(s) concerned.

9. A transmission system according to claim 8 and intended to be used for the flight control of an aircraft, wherein said calculation means are constituted by a flight control calculator and wherein said receivers control devices of the aircraft.

* * * * *